Sept. 25, 1951     J. A. HALFORD     2,569,432
LAWN SPRINKLER SYSTEM
Filed May 6, 1947     2 Sheets-Sheet 1
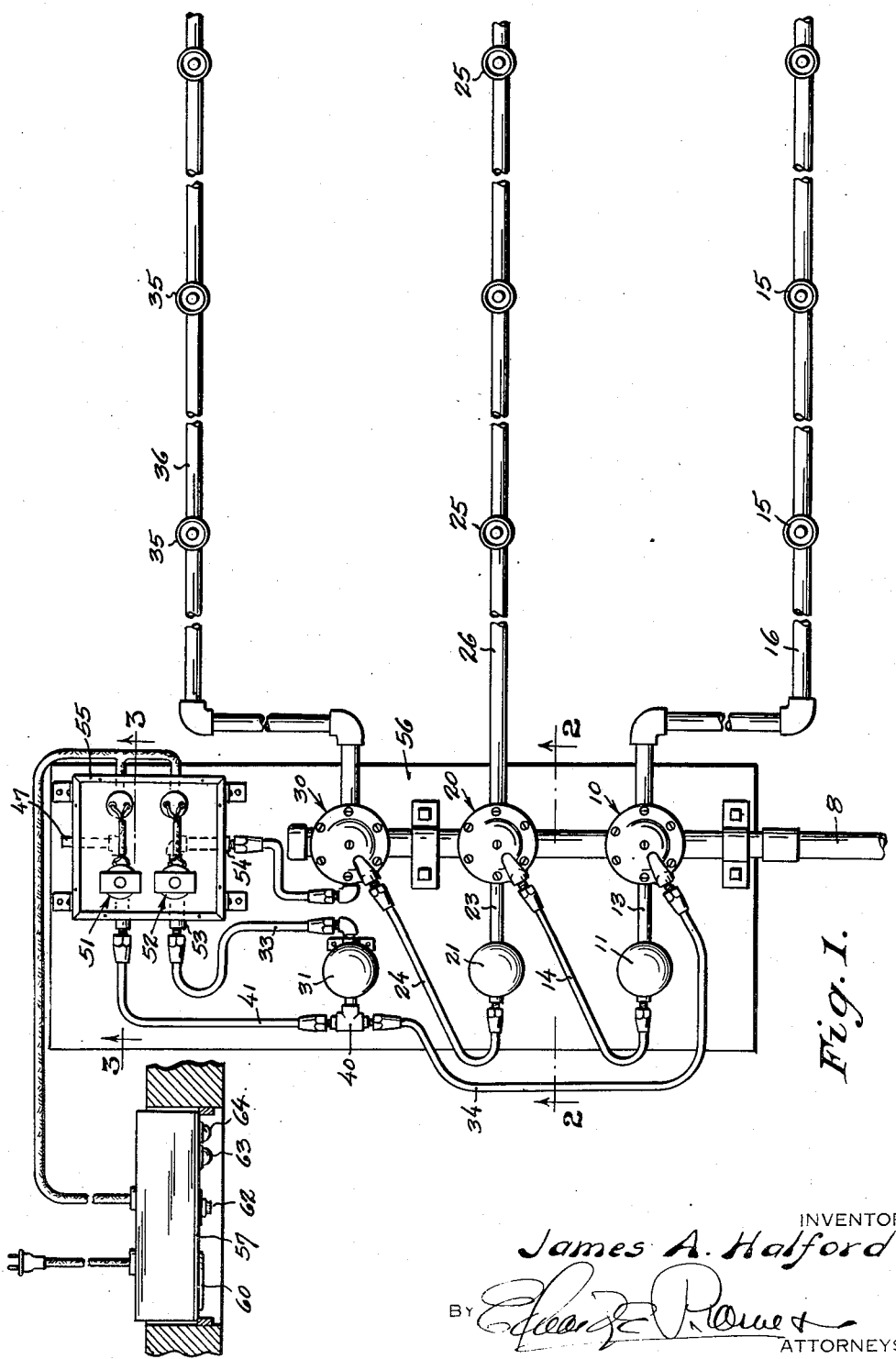
INVENTOR.
*James A. Halford*
BY *George E. Rowe*
ATTORNEYS.

Sept. 25, 1951 J. A. HALFORD 2,569,432
LAWN SPRINKLER SYSTEM
Filed May 6, 1947 2 Sheets-Sheet 2

INVENTOR.
James A. Halford
BY
ATTORNEYS.

Patented Sept. 25, 1951

2,569,432

UNITED STATES PATENT OFFICE 2,569,432

LAWN SPRINKLER SYSTEM

James A. Halford, Seattle, Wash.

Application May 6, 1947, Serial No. 746,379

1 Claim. (Cl. 161—7)

This invention relates to lawn sprinkler systems of that general nature in which a severalty of sprinkler heads are applied to each of a number of separate branch lines connected in circuit and fed with pressure water from a common main, the main having valved connection with the branches and the system being peculiarized in that the valves which are introduced between the main and the branches work sequentially in repeating cycles of operation, thus to permit comparatively large areas of lawn to be effectively sprinkled from a main which either by reason of friction losses or an inefficient head of water would be entirely incapable of carrying the sprinkling load were it to be subjected to a simultaneous discharge from all of the heads. There are available within the industry several lawn-sprinkler systems which incorporate plural sets of sprinkler heads so arranged as to have the sets work in repeating cycles of sequential operation, and perhaps the most widely used of these systems is patterned from the disclosure of U. S. Patent No. 2,068,102, issued Jan. 19, 1937, to E. L. Gaines.

In the type of sprinkler system to which I refer the arrangement is such that, once any branch pipe is opened to the pressure of the main and water allowed to flow thereinto, a cycle of operation is initiated. The system is then self-perpetuating to the extent that the cyclic action will repeat itself until such time as the operator elects to stop the sprinkling, and there has been incorporated in prior repeater-type sprinkler systems a manually operated control valve or valves for the purpose of accomplishing this stopping as well as the starting of the system. Where dependence must be placed upon an individual both to start and to stop a sprinkling system, a lawn so equipped is very apt to be either watered excessively or to suffer from lack of water.

It is the principal object of the present invention to eliminate the human factor by engineering into a repeating cyclic-action sprinkler system of the nature described an arrangement of parts including automatic controls functional daily at selectively variable times and without any attention whatsoever to initiate and carry through a series of steps necessary to start a repeating cycle of the system's sequential operation and, following a selectively variable time interval, open the circuit to cause the sprinkling operation to cease.

The above, together with other objects and advantages which I consider to be important, will become apparent in the course of the following description and claim, the invention consisting in the novel arrangement, adaptation, and combination of parts hereinafter described and claimed.

Reference is made in the following description to the accompanying drawings, wherein:

Figure 1 is a somewhat schematic fragmentary top plan view illustrating a sprinkling system embodying the present improvements.

Figure 5:
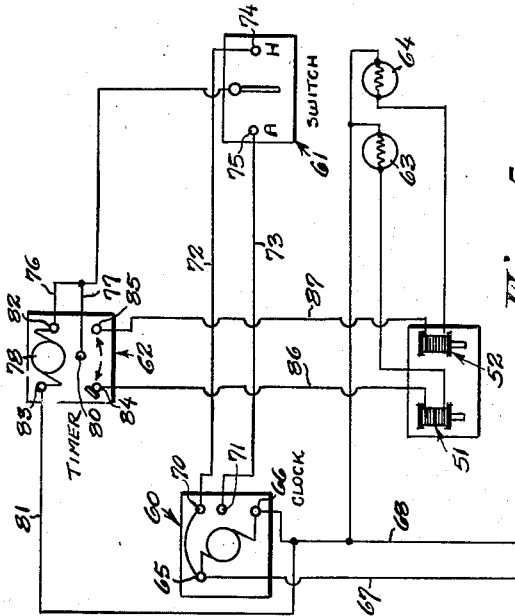
Fig. 5 is a wiring diagram of the electrical circuit which I employ to carry the present invention into practice.

It is thought that the present invention will be best understood by first describing the structural nature and manner of operation of a repeater type of cyclic-acting lawn sprinkler system. In the usual hook-up of this system there is employed a main pipe 8 leading from a pressure source of water supply and making connection by nipples 9 with two or more flow-governing master units indicated in the drawing as being three in number and designated 10, 20 and 30. Each of these master units comprises a valve casing separated into three chambers, and namely an admission chamber open to the pressure of the main, a discharge chamber thereabove normally isolated from the admission chamber by a globe valve closing against the pressure of the main, and a pilot chamber located at the upper end of the casing and separated from the discharge chamber by a diaphragm. The diaphragm and the globe valve are tied for unitary movement by a connecting spindle which is made hollow to bring the pilot chamber into communication with the admission chamber, and fitting loosely in this flow duct is a stationary needle leaving only sufficient space thereabouts to allow for a trickle flow of pressure water into the pilot chamber. The size of the diaphragm is such that the surface area exposed to the pressure of the water within the pilot chamber exceeds the surface area of the globe valve exposed to the pressure of the main, and the consequence is that the globe valve will, in the absence of modifying factors, be normally held in closed position. Associated with the master units are respective pressure tanks 11, 21 and 31 sustained upon a respective double-branch fitting 12, and one branch opening of each said fitting connects, as by pipes 13, 23 and 33, with the discharge chamber of its related master unit while there is attached to the other branch opening a tube leading to the fitting from the pilot chamber of one of the other master units. Considered in more particularity, one of these tubes, denoted 14, connects the pilot chamber of the master unit 20 with the double-branch fitting of the pressure tank 11, a second said tube, denoted 24, connects the pilot chamber of the master unit 30 with the double-branch fitting of the pressure tank 21, and the remaining tube 34 connects the pilot chamber of the master unit 10 with the double-branch fitting of the pressure tank 31. While the tubes 14, 24 and 34 normally are isolated from the related pipes 13, 23 and 33, water within the latter, when under pressure, is fed through a trickle opening into the heads of the pressure tanks, and it is a feature of the referred-to Gaines' system that air trapped within the pressure tanks and caused to be compressed by this trickle admission of pressure water serves, when allowed to expand, as an instrumentality for opening a valve bringing the tube 14, 24, or 34, as the case may be, into communication with the related pipe 13, 23, or 33. The sprinkling heads for the system are denoted 15, 25, and 35, and are carried upon branch pipes 16, 26, and 36 connecting with the discharge chambers of the master units 10, 20 and 30, respectively.

Before proceeding with a description of the parts which constitute the improvements of the present invention, it is thought advantageous to here trace the manner of the sprinkling system's sequential operation, and in order that a cycle of action will commence let it be assumed that pressure water contained within the pilot chamber of the master unit 10 is bled from such chamber to the atmosphere in a quantity exceeding the flow capacity of the hollow stem which leads from the admission chamber into the pilot chamber of such unit. This bleeding action causes the pressure upon the diaphragm to drop below the pressure of the main, and the resulting differential is asserted upon the globe valve to open the latter, whereupon pressure water flows from the main into the discharge chamber of the master unit 10 and passes therefrom into the branch pipe 16 and to the sprinkler heads 15 carried thereby. Coincident with the feed of this water into the branch pipe, the back pressure which is set up within the latter forces the pressure water through pipe 13 into the fitting 12 of the pressure tank 11. This pressure water then works upwardly by the described trickle flow into the surmounting tank, and such flow is allowed to continue until the air is fully compressed, whereupon the bleeding of water from the pilot chamber is discontinued. Now, as the continued flow of water from the main through the restricted orifice of the hollow stem into the pilot chamber of the unit 10 builds up an effective pressure upon the diaphragm over-balancing the opposing pressure applied from the main against the underside of the globe valve, the globe valve is consequently moved into its closed position and the pressure within the discharge chamber of the unit 10 responsively drops to atmospheric. Responding to this pressure drop, the compressed air within the tank 11 is allowed to expand and performs its intended office of opening the valved port to communicatively connect the tube 14 with the pipe 13, whereupon pressure water within the pilot chamber of the master unit 20 is allowed to escape into and through the discharge chamber of the master unit 10 to the branch pipe 16 wherefrom it bleeds into the atmosphere with the result that the lessened pressure upon the diaphragm of the master unit 20 allows the pressure of the main to open the globe valve of this latter unit, and the sprinkling heads 25 of the branch pipe 26 now operate. Coincident with such sprinkling, and in the same manner as above described for the pressure tank 11, pressure water backs off from unit 20 into pipe 23 and works upwardly through the trickle opening into the pressure tank 21 with a resulting compression of the air contained in this tank. The sprinkling from branch pipe 26 continues until pressure water forced by compressed air back through the trickle opening from the previously acting pressure tank 11 into the line 13 returns the pressure of the air in this tank to normalcy, whereupon the line 14 again becomes isolated from the pipe 13, and the head pressure builds up upon the diaphragm of the unit 20 to close the globe valve of the latter. As the compressed air within the tank 21 now is allowed to expand it opens the line 24 to the pipe 23, and pressure water thereupon bleeds from the pilot chamber of the master unit 30 into the low-pressure discharge chamber of the unit 20, and the globe valve of the unit 30 responsively opens to effectuate a sprinkling action through the heads 35 of the branch pipe 36. Just as with the unit 20, the pressure water entering the discharge chamber of the unit 30 feeds to the pressure tank 31, and a cycle of operation is completed as the air thus compressed and later allowed to expand, following a closing of the globe valve of unit 30, causes the line 34 to be brought into communication with the low-pressure discharge chamber of unit 30. The sequential cyclic action of the circuit of master units will perforce repeat itself endlessly until one of the interconnecting lines in the circuit is made non-responsive to the automatic chain action. For this uprpose, namely that of breaking the chain action, and also for initiating a commencement of the system's operation, and to reiterate, it has been usual to provide manually operated valves.

According to the present invention, which makes the system fully automatic, a T-fitting 40 is cut into the line 34, and attached to the third of the three openings which this fitting provides is a pipe 41 leading by its other end to a valve casing 42. This valve casing has two chambers denoted 43 and 44, one of which connects by a nipple 45 with the pipe 41 and the other of which feeds by connecting pipe sections 46—47 to the atmosphere, and the valve for such casing functions as a retractable closure for a duct 48 connecting the two chambers. Designated 49, the valve is of the needle variety and is produced as an axial prolongation of the movable armature 50 of a solenoid unit denoted generally by 51, and as a companion unit substantially identical with such solenoid 51 there is provided a second solenoid denoted generally by 52 and which similarly provides a needle valve movable in unison with the armature and functioning as a retractable closure for a connecting duct between two chambers of a second valve casing. I cut the second valve casing into the line 33 between the master unit 30 and its related pressure tank 31 with the couplings indicated as comprising a nipple 53 making connection with one of the two chambers and a nipple 54 making connection with the other chamber of the casing. The two solenoid units are by preference received one alongside the other in a suitable box 55 mounted upon a control board 56 which also carries the master units and their pressure tanks. This control board, with its sustained parts, is quite compact and is or may be housed in a suitable case which may be installed wherever desired, most usually in an inconspicuous above-ground position adjacent the lawn which is to be sprinkled and shielded from view, say, by a shrub or the like.

Figure 4:
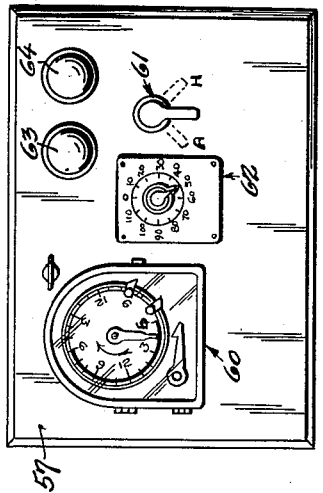
Fig. 4 is an elevational view of the instrument panel shown in top plan in Fig. 1.
Figure 2:
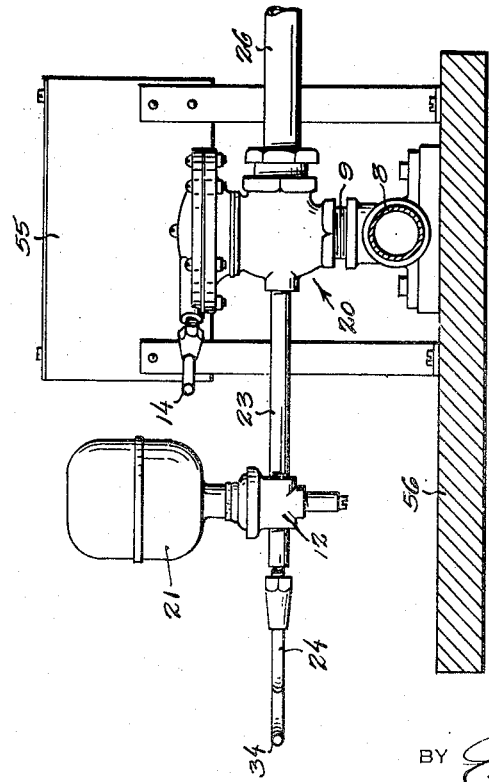
Fig. 2 is a transverse vertical sectional view taken to an enlarged scale on line 2—2 of Fig. 1.
Figure 3:
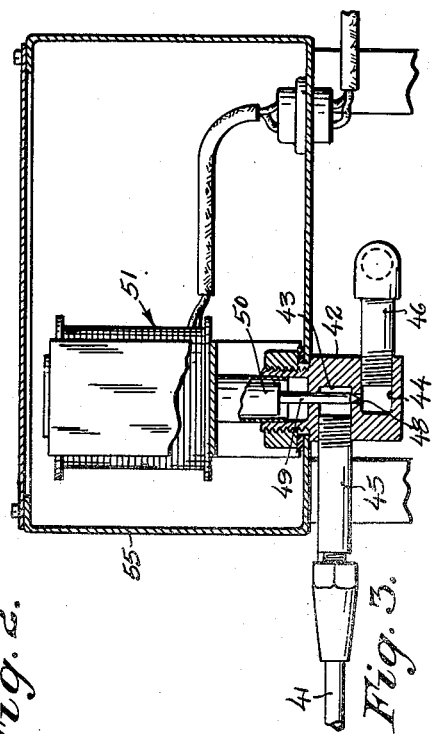
Fig. 3 is a fragmentary transverse vertical sectional view taken to an enlarged scale on line 3—3 of Fig. 1.

Associated with the solenoid units and installed in any convenient location, and which may be either proximate to or remote from the control board inasmuch as the only connections therebetween are electrical wires, there is provided a control panel 57. On this panel, and wired in series circuits with the solenoids, are an electric clock 60, a master switch 61, an electric timer 62, and a pair of signal lamps 63—64. The clock is of the usual or a suitable character providing a motor wired in a circuit which includes the two terminals 65 and 66 connecting by live wires 67 and 68 with a source of electric current, and there are presented two other terminals 70 and 71 of which the former is permanently connected with the terminal 65 and of which the latter is arranged by the action of the clock to be brought periodically into electrical connection with said terminal 65, maintaining such connection for selectively variable intervals of time. Otherwise and more particularly stated, the clock which I employ has one or more sets of tripper pins— two pins to a set—secured in adjusted positions upon the rim of a 24-hour movable dial, and as the leading pin of a set trips an associated trigger the two terminals 65 and 71 are brought into electrical connection and this connection then maintains itself until the trailing pin traveses the trigger, whereupon the connection is broken. Two sets of pins are preferably applied to the clock dial, so placed as to establish an electrical connection across the terminals 65 and 71 for, say, an hour or more in the morning and an hour or more in the evening. While the showing is intended to be symbolic only, there is represented in Fig. 4 a clock dial, a single set of trip pins, and the trigger.

From the two terminals 70 and 71 separate leads 72 and 73 provide electrical connection with terminals 74 and 75 of the master switch 61. This is a three-way switch the blade of which is movable from a central circuit-opening position into engagement either with the terminal 74 or the terminal 75, the blade itself being permanently connected to the timer 62 by branch wires 76 and 77 one of which wires leads to one side of a drive motor 78 of the timer and the other of which branches connects as at 80 with the root end of the governing hand of the timer. The circuit through the motor of the timer is completed by a wire 81 which connects with the live circuit wire 68. In the timer which I prefer to employ, and which, however, is only one of several applicable units available in the open market, the governing hand moves by the action of the motor and against the resistance of a return spring in a counter-clockwise direction through a circle of travel scaled from zero to 120. Representing seconds, the hand will thus travel the full circle in two minutes, and may be set for any desired lesser time interval, with the arrangement being such that the spring, upon a deenergizing of the motor, returns the hand to and yieldingly holds the same at its given setting. In addition to the two motor terminals 82 and 83, and the said terminal 80, the timer has two other terminals 84 and 85. The operation of the timer is such that, simultaneously with the energizing of the motor, a connection is made from the terminal 80 to the terminal 84, and this connection is then maintained until the moving hand of the timer reaches a zero reading, whereupon the connection is broken and a new connection is made from the terminal 80 to the terminal 85. The latter connection maintains itself until the circuit opens at which time the spring asserts its suppressed load and swings the hand back to its given setting.

From the two terminals 84 and 85 connections are made by separate wires 86 and 87 one with one side of the solenoid 51 and the other with one side of the solenoid 52, and from the other sides of the solenoids respective connections are made through the signal lamps 63 and 64 back to the live circuit wire 68. The two lamps are visible, by preference, through lenses of easily distinguished colors, say a red lens for the lamp 63 and a green lens for the lamp 64.

To now trace the operation of my fully automatic lawn sprinkling system, let it be assumed that a period of 50 seconds will suffice for the permitted trickle of water to compress the air within the pressure tanks to a degree sufficient to enable the latter to perform their above-described office. The governing hand of the timer is then set for this travel, and the tripper pins of the clock are adjusted upon the dial of the latter in accordance with the desired times and durations of the sprinkling operations.

The master switch is snapped into its "A" position, signifying automatic operation, and as the clock's movement brings the leading pin of a tripper set into engagement with the circuit-closing trigger a circuit is closed from terminal 65 to the terminal 71 and thence through the switch to the timer. The motor of the timer is now energized to activate the governing hand of the latter in its travel towards zero, and a connection is simultaneously made between terminals 80 and 84 which closes a circuit through solenoid 51 and the lamp 63. The working of the solenoid retracts the related needle valve, and pressure water consequently bleeds through pipe 34 from the pilot chamber of the master unit 10 as the pipe 41 becomes opened to the atmosphere, starting a cycle of operation. Now, as the governor hand of the timer reaches zero, the circuit through solenoid 51 is opened, the pipe section 41 is closed to the atmosphere, and a circuit including the solenoid 52 is closed which serves to open the needle valve related to the latter. Now, as the advancing cycle of operation reaches the master unit 30, pressure water is permitted to first flow from the discharge chamber of said unit to the pressure tank 31 and then back to said discharge chamber from the pilot chamber of the unit 10, and the operation of the system thereupon becomes repeating in nature. The circuit including solenoid 52 remains closed until the trailing element of the moving set of tripper pins activates the trigger of the clock to break the connection between terminals 65 and 71, and the entire circuit then opens with a responsive deenergizing of the solenoid and a closing of its related valve. The action of the sprinkling system continues until a cycle of operation which ends with the unit 30 is completed.

Should it be desired to operate the systems at any time other than the time or times for which the clock is set, the switch 61 is turned to the "H" position, signifying hand control, and the result thereof is to cut the clock out of the circuit, the current now passing directly from the live circuit wire 67 to the terminal 74 of the master switch. Identically the same sequence of operation as occurs under automatic control then takes place, excepting that the switch blade must be moved to inactive position to terminate the repeating cyclic action of the sprinkler system.

Aside from the human element which is a major objection to the prior manually-controlled repeater type of cyclic-acting sprinkling system, my perfected system providing automatic control is especially advantageous from the standpoint of permitting a home owner to absent himself for unlimited periods of time and be assured that this lawn will be adequately watered throughout the period of such absence.

The described lawn sprinkler system and the manner of its operation will, it is believed, be clear from the foregoing. Minor departures from the embodiment which I have here elected to illustrate may obviously be resorted to without departing from the spirit of the invention, and no limitations are to be implied by reason of having particularly described such illustrated embodiment. It is my intention that the hereto annexed claim be read with the broadest scope commensurate with the language used.

What I claim is:

In a lawn-sprinkling system of a nature employing a plurality of discharge branches each having separate valved connection with a pressure source of water supply, and providing control means including a pair of normally closed pipes one of which is so associated with the valves as, by its opening, to open a related one of the valves and, by its closing, to close said valve and at the same time initiate a sequential operation of the other valves in the system and the other of which pipes is so associated with the valves after such initiation, as to permit such sequential operation, and by its closing, to terminate recurrent repetition of the cycle of sequential operation, a control valve for each of said pipes, a solenoid for each control valve operative when energized to open the related pipe, independent and normally open electric circuits for the solenoids, an electric timer, means responsive to the operation of the timer for first closing the circuit for the solenoid of the first-named pipe at a predetermined short interval and then closing the circuit for the solenoid of the second-named pipe, a normally open circuit for the electric timer, an electric clock, and means responsive to the operation of the clock for closing the circuit for the timer at a predetermined time reading of the clock and for opening said circuit at a later predetermined time reading, said electric timer being adapted to be automatically reset with the opening of the circuit therefor.

JAMES A. HALFORD.

REFERENCES CITED

The following references are of record in the file of this patent:

UNITED STATES PATENTS

| Number | Name | Date |
|---|---|---|
| 2,068,102 | Gaines | Jan. 19, 1937 |
| 2,252,125 | Hauser | Aug. 12, 1941 |
| 2,395,150 | Sloan et al. | Feb. 19, 1946 |